United States Patent
Roz

[11] Patent Number: 6,127,929
[45] Date of Patent: Oct. 3, 2000

[54] TRANSPONDER FOR HALF-DUPLEX COMMUNICATION

[75] Inventor: Thierry Roz, Prêles, Switzerland

[73] Assignee: EM Microelectronic-Marin SA, Marin, Switzerland

[21] Appl. No.: 09/196,351

[22] Filed: Nov. 19, 1998

[30] Foreign Application Priority Data

Dec. 23, 1997 [CH] Switzerland ............................ 2956/97

[51] Int. Cl.⁷ .................................................. G08B 21/02
[52] U.S. Cl. ...................... 340/572.5; 327/408; 343/720; 343/745; 343/749
[58] Field of Search ......................... 340/572.5; 343/720, 343/745, 749, 788; 327/408, 404, 416

[56] References Cited

U.S. PATENT DOCUMENTS

| | | | |
|---|---|---|---|
| 3,602,738 | 8/1971 | Bohm | 307/251 |
| 5,099,227 | 3/1992 | Geiszler et al. | 340/572.5 |
| 5,105,190 | 4/1992 | Kip et al. | 340/572.5 |
| 5,517,179 | 5/1996 | Charlot, Jr. | 340/572.5 |

FOREIGN PATENT DOCUMENTS 0 777 193 A1 6/1997 European Pat. Off. .
96/28880 9/1996 WIPO .

*Primary Examiner*—Glen Swann
*Attorney, Agent, or Firm*—Sughrue, Mion, Zinn, Macpeak & Seas, PLLC

[57] ABSTRACT

A transponder (30), intended to exchange data during a half duplex communication, includes a coil (3), a capacitor (8) connected to the coil to form a resonant circuit, and processing means (33) arranged to process the data. The transponder further includes switching means (32) arranged so that, under the control of the processing means, the switching means connect the processing means in series with the capacitor and the coil which are connected to form, during the entire duration of the reception phase, a parallel LC circuit and, during the entire duration of the transmission phase, a series LC circuit to optimize the electric power exchanged between an antenna and the processing means.

6 Claims, 7 Drawing Sheets

TRANSPONDER FOR HALF-DUPLEX COMMUNICATION

BACKGROUND OF THE INVENTION

The present invention concerns the field of transponders and, more particularly, transponders for half duplex communication.

There exist conventionally a large number of portable devices for allowing identification from a distance of an unknown object. Typically, data are transferred in the form of radioelectric signals, between a base station and a portable device which is usually made using a transponder.

FIG. 1 shows a conventional transponder 1 which includes an antenna 3 for receiving and transmitting data in the form of radioelectric signals, processing means 5 connected to antenna 3 for processing the received data and the data to be transmitted, supply means 7 for providing a supply voltage Vdd to the different components of transponder 1, in particular to processing means 5.

Half duplex communication between the base station and transponder 1 includes two operating phases: a reception phase and a transmission phase.

During the reception phase, the base station transmits a radioelectric signal X1, antenna 3 receives it and converts it into an electric voltage $U_1$. The base station can also supply the electric energy necessary for the electric supply of transponder 1, by transmitting signal X1 at a sufficiently high electric power. In this particular case, transponder 1 operates like a <<passive>> component, and supply means 7 include a storage capacitor intended for storing said electric energy.

During the transmission phase, an electric voltage $U_2$ is present across the terminals of processing means 5, and is supplied to antenna 3 which converts it into a radioelectric signal X2. In the particular case in which transponder 1 is passive, capacitor 7 which has stored electric energy during the reception phase, supplies the electric power necessary for the operation of processing means 5 during the transmission phase.

One problem encountered during such communication lies in the optimization of the electric energy transferred between antenna 3 and processing means 5.

A conventional solution to this problem consists in connecting a capacitor 8 in parallel to antenna 3, so as to form a circuit of the parallel LC type, as is shown in FIG. 1. This circuit can supply voltage $U_1$ at a maximum amplitude, when the frequency of such voltage is equal to the resonance frequency fo of such circuit. It is then said that the LC circuit is voltage resonant. It will be recalled that resonance frequency fo of an LC circuit is defined as follows:

$$fo = \frac{1}{2\pi\sqrt{LC}} \quad (1)$$

By way of illustration, FIG. 2 shows a wave shape 9 illustrating the change in voltage $U_1$ as a function of its frequency f, in the case where the circuit is of the parallel LC type. Thus, when frequency f of this voltage is substantially equal to said resonance frequency fo, the amplitude of voltage $U_1$ is maximum, the reference $U_{1max}$ designating said maximum voltage value.

Consequently, recalling that the mean power absorbed by processing means 5 is directly proportional to the square of voltage value $U_{1max}$, this electric power is then optimum during the reception phase of a communication of the aforementioned type, supposing that signal X1 is periodic at frequency fo. In other words, the transfer of electric energy between antenna 3 and processing means 5 is optimum during the reception phase.

One drawback of the aforementioned conventional solution lies in the fact that, during the transmission phase, the parallel LC circuit does not allow the transfer of energy between processing means 5 and antenna 3 to be optimized. Indeed, during this phase, in the event that the circuit connected to the terminals of processing means 5 is of the parallel LC type, said means provide a current I2, and the voltage U2 present across the terminals of said means is limited by its input characteristics. There results a limitation of the energy present in antenna 3, as well as the magnetic field generated by such antenna during the transmission phase.

The Applicant of the present invention has thus observed that the conventional transponders such as that described in relation to FIG. 1, do not satisfactorily answer the aforementioned problem, since the exchange of electric energy during a half duplex communication is not optimum, as was described in detail hereinbefore.

SUMMARY OF THE INVENTION

One object of the present invention is to provide a transponder which overcomes the drawbacks of conventional transponders, in particular to optimise the electric energy exchanged during the reception and transmission phases during a half duplex communication.

Another object of the present invention is to provide a transponder which answers the conventional criteria in the semi-conductor industry as to complexity and cost.

These objects, in addition to others, are achieved by a transponder intended to receive data during a first phase or reception phase, and to provide other data during a second phase or transmission phase, said transponder including: a coil arranged as an antenna so as to be able to receive and transmit radioelectric signals containing said data; a capacitor connected to said coil, to form a resonant circuit; processing means arranged to be able to receive, process and supply said data; and supply means connected to said processing means, and arranged to be able to provide an electric supply signal to different components of the transponder, said transponder further including switching means connected to the capacitor and the processing means, and arranged so that, under the control of the processing means, the switching means can connect the processing means in series to the capacitor and the coil which are connected to each other to form, during the entire duration of the reception phase, a parallel LC circuit and, during the entire duration of the transmission phase, a series LC circuit.

One advantage of the switching means of the transponder according to the present invention is that two different configurations of the transponder are achieved, in the reception phase and the transmission phase, able to optimize the electric power exchanged between the antenna and the processing means.

One advantage of the transponder according to the present invention lies in the fact that it is formed of components which are usually manufactured in the semi-conductor industry, in particular by manufacturing steps of a process of the CMOS type, which is known.

These objects, features and advantages of the present invention, in addition to others, will appear more clearly upon reading the detailed description of a preferred embodiment of the invention, given solely by way of example, in relation to the annexed drawings, in which:

DESCRIPTION OF A PREFERRED EMBODIMENT

Figure 3:
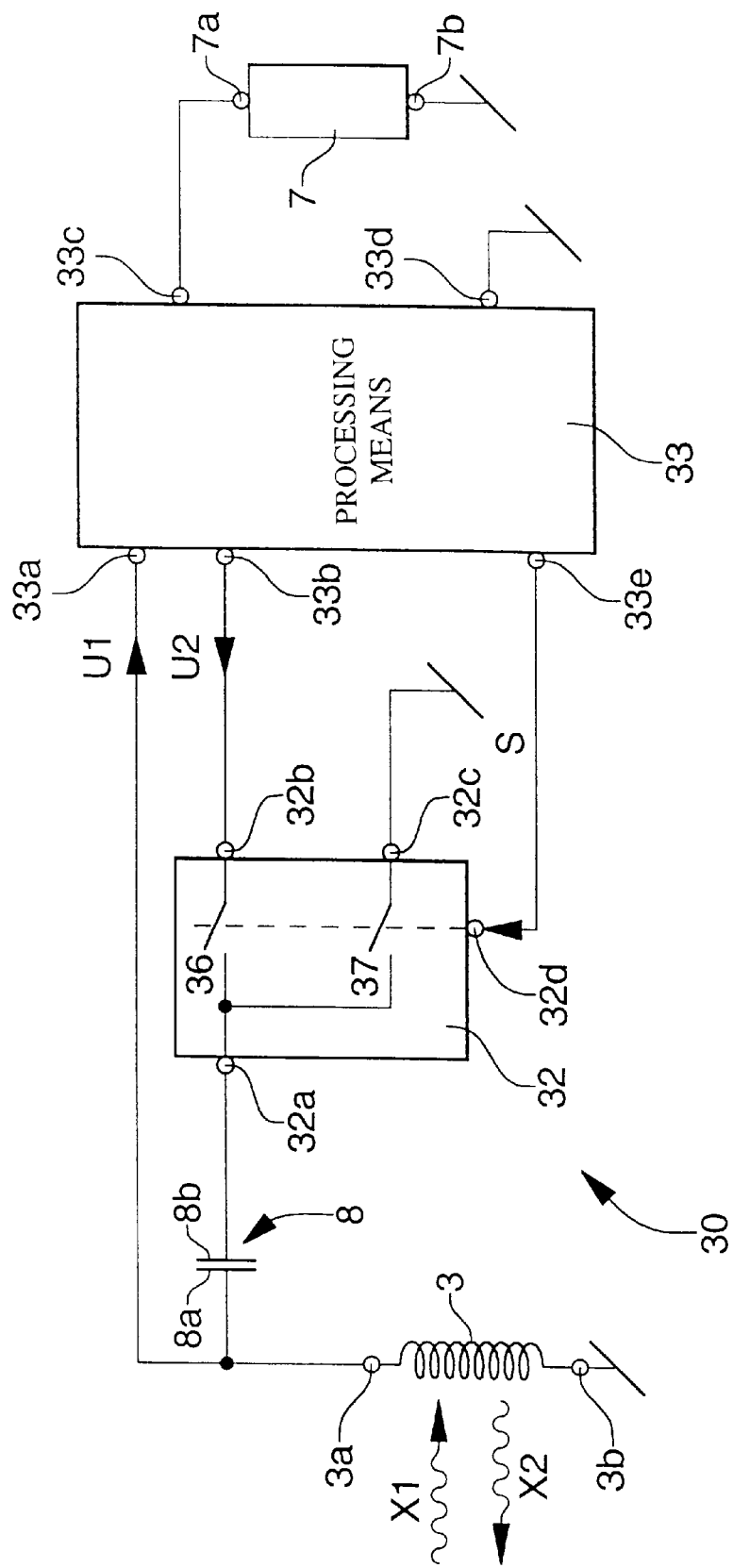
FIG. 3 shows a transponder according to the present invention.

FIG. 3 shows a transponder 30 according to the present invention.

Figure 1:
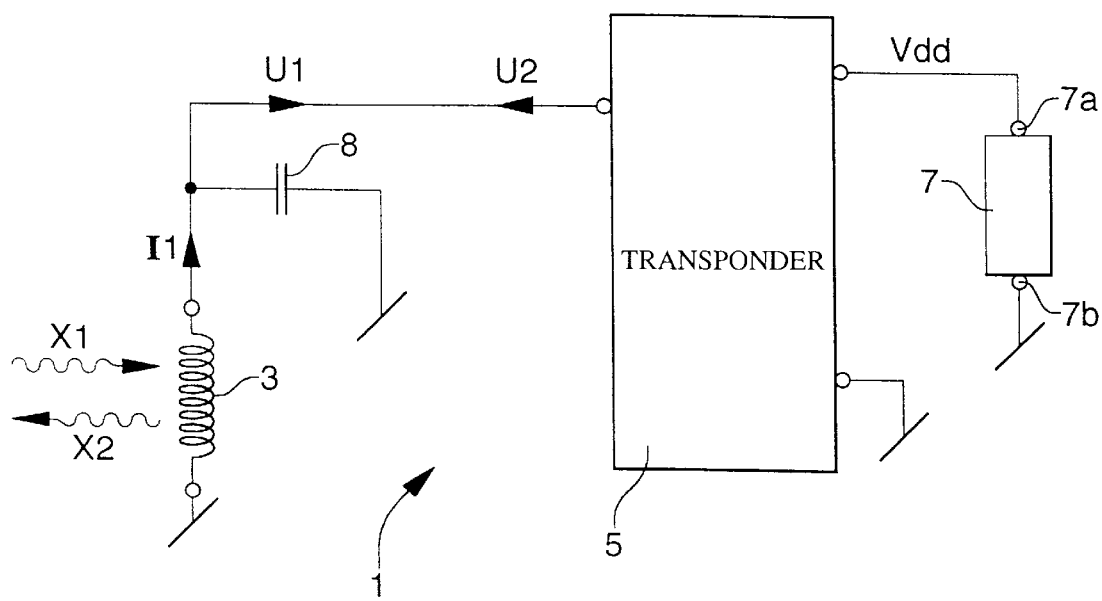
FIG. 1 which has already been cited, shows a transponder according to the prior art.

It will be noted that transponder 30 shown in FIG. 3 has a structure which is close to transponder 1 shown in FIG. 1. Thus, for the sake of simplicity, the components shown in FIG. 3 and designated by the same references as those shown in FIG. 1, are substantially identical to those designated in FIG. 1.

Thus the transponder 30 includes an antenna 3, a capacitor 8, processing means 33 and supply means 7.

During a half duplex communication such as that defined hereinbefore, transponder 30 is intended to receive data during the reception phase, and to provide other data during the transmission phase. For this purpose, the aforementioned components are arranged and connected as described hereinafter.

Antenna 3 is arranged to receive and transmit radioelectric signals X1 and X2 containing the data exchanged between a base station (not shown) and processing means 33. For this purpose, antenna 3 includes two connecting terminals 3a and 3b via which an electric voltage U1, containing the data to be processed by processing means 33, is provided, as well as an electric voltage U2 containing the data to be transmitted. Moreover, terminal 3b is connected to the ground of transponder 30.

Antenna 3 is made using a coil, in a known manner.

Capacitor 8 is arranged so as to be able to be connected to antenna 3. For this purpose, capacitor 8 includes a first terminal 8a connected to terminal 3a of antenna 3, and a second connecting terminal 8b.

Capacitor 8 is made using a capacitive component, in a known manner.

Processing means 33 are arranged so as to be able to receive, process and supply said data exchanged with antenna 3. For this purpose, processing means 33 includes an input terminal 33a connected to terminal 3a of antenna 3, for receiving voltage U1, and an output terminal 33b for supplying voltage U2. Moreover, processing means 33 include a supply terminal 33c so as to be able to receive an electric power supply, a ground terminal 33d connected to the ground of transponder 30, and also a control terminal 33e so as to be able to provide a control signal S.

Processing means 33 are made by forming a conventional logic block and a conventional interface arranged between such block and antenna 3.

Supply means 7 are arranged so as to be able to provide the electric power supply to processing means 33, in the form of a supply voltage Vdd. For this purpose, supply means 7 include a connecting terminal 7a connected to terminal 33c of processing means 33, and a ground terminal 7b connected to the ground of transponder 30.

In order to make supply means 7, a distinction will be made between two types of known transponders. In the aforecited case in which transponder 30 is "passive", supply means 7 are made by using a storage capacitor intended to store the electric energy transmitted during the reception phase. Conversely, in the case of an "active" transponder, supply means 7 are made using a conventional lithium battery.

Moreover, transponder 30 includes switching means 32 which are connected to capacitor 8, processing means 33 and the ground of said transponder. For this purpose, switching means 32 include a first connecting terminal 32a connected to terminal 8b of capacitor 8, a second connecting terminal 32b connected to terminal 33b of processing means 33, and a third connecting terminal 32c connected to the ground of transponder 30. Moreover, switching means 32 include a control terminal 32d connected to terminal 33e of processing means 33, for receiving signal S.

Essentially, switching means 32 include two switches 36 and 37 which are connected to terminal 32d, so as to be able to be controlled by signal S. Moreover, switch 36 is connected between terminal 32a and terminal 32b, and switch 37 is connected between terminal 32a and terminal 32c.

Switching means 32 are arranged so as to be able to receive, via terminal 32d, control signal S supplied by processing means 33, and to connect in response processing means 33, capacitor 8, and antenna 3, as is described in detail hereinafter.

At the beginning of the reception phase, processing means 33 controls the closing of switch 37 and the opening of switch 36.

Figure 4:
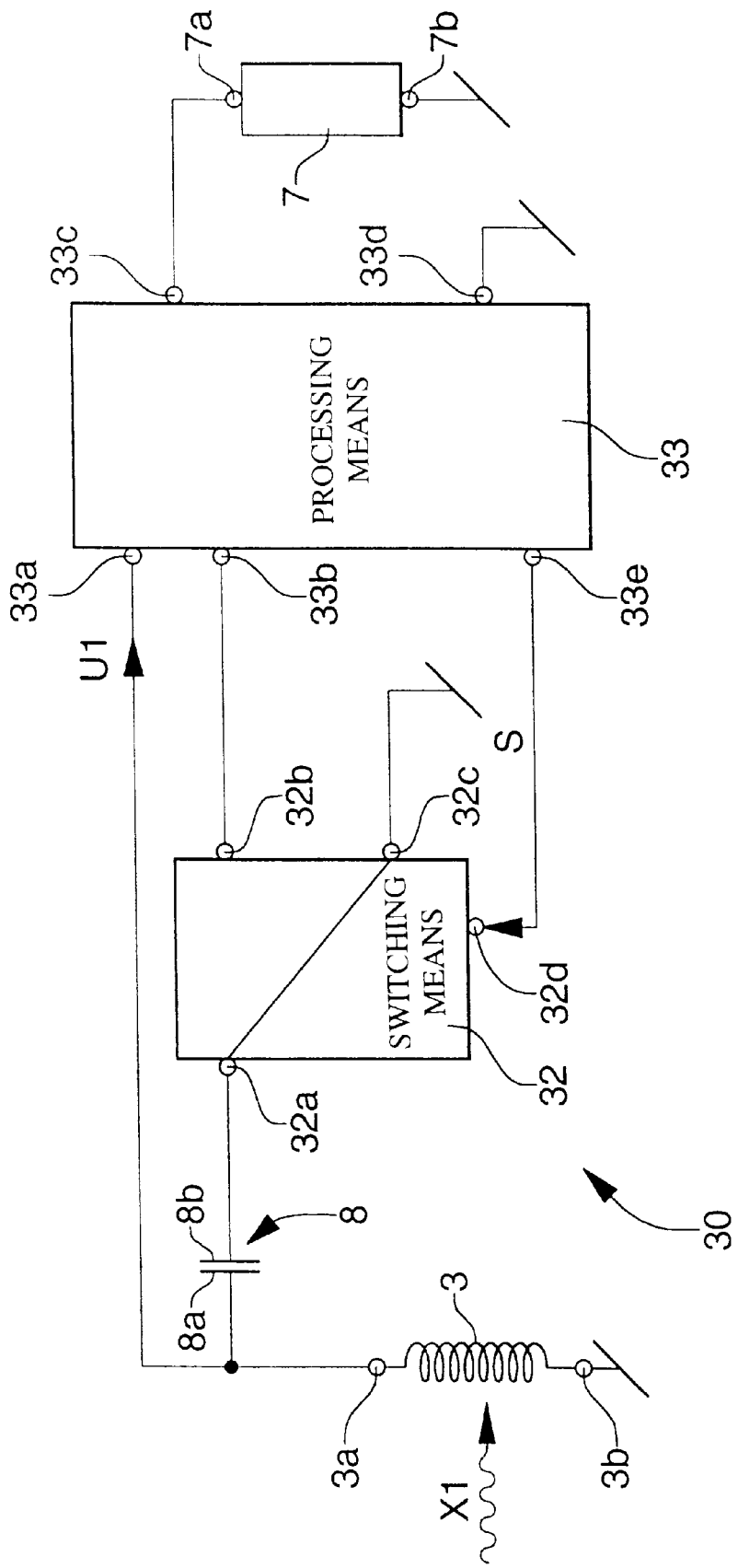
FIG. 4 shows in detail the transponder of FIG. 3, during a reception phase.

FIG. 4 shows in detail transponder 30 during the reception phase, in particular the connections established by switching means 32.

Thus, since the transponder of FIG. 4 has the same structure as the transponder of FIG. 3, the components shown in FIGS. 3 and 4 are designated by the same references as in these two Figures.

It will be noted that, during the reception phase, switching means 32 connects terminal 32a to terminal 32c so that antenna 3 is connected in parallel to capacitor 8. In other words, capacitor 8 and antenna 3 are connected so as to form a parallel LC circuit. In this case, a configuration close to that of conventional transponder 1, described hereinbefore in relation to FIG. 1, is again seen.

During the half duplex communication, the reception phase is followed by the transmission phase. At the beginning of this phase, processing means 33 controls the opening of switch 37 and the closing of switch 36.

Figure 5:
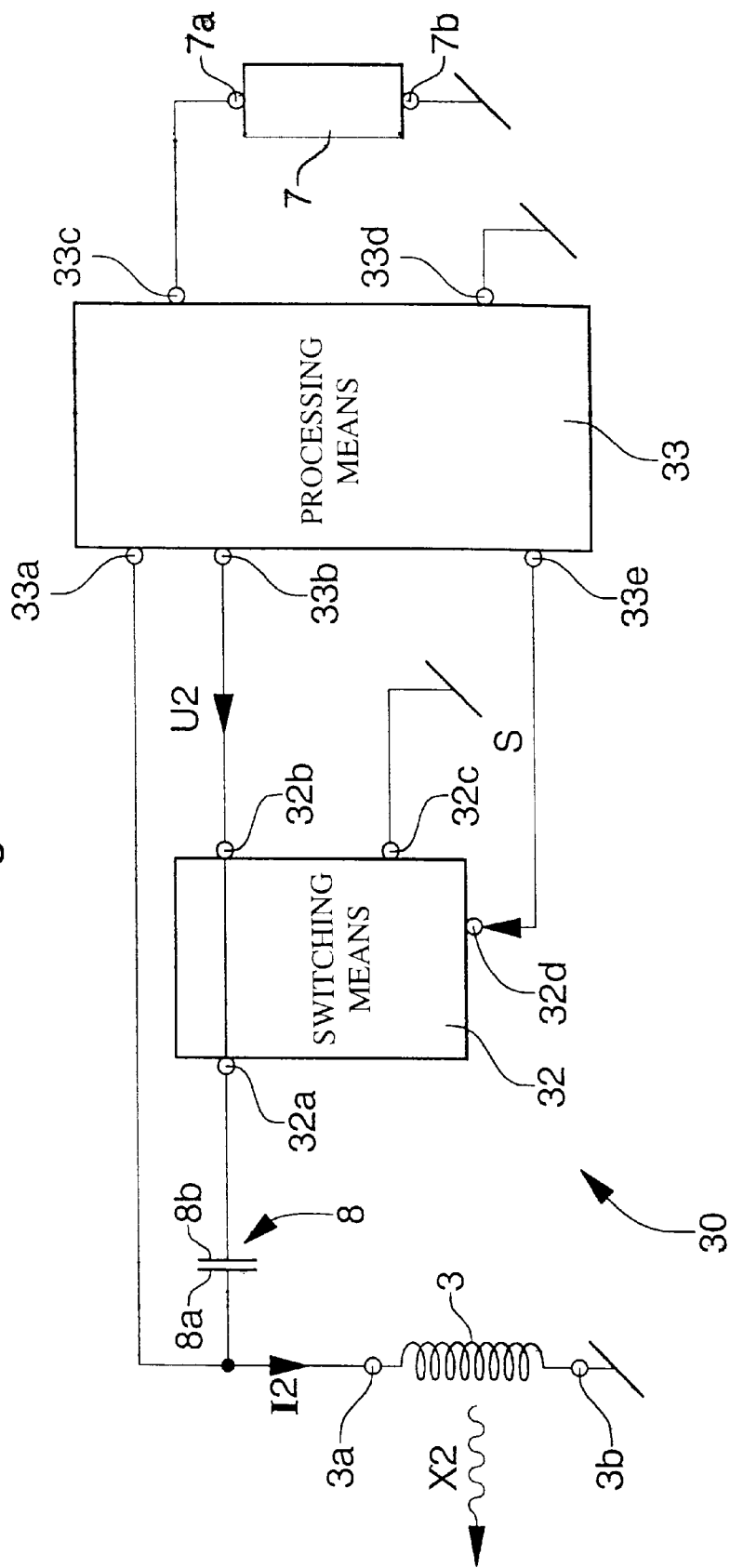
FIG. 5 shows in detail the transponder of FIG. 3, during a transmission phase.

FIG. 5 shows transponder 30 in detail, during the transmission phase, in particular the connections established by switching means 32.

Thus, since the transponder of FIG. 5 has the same structure as that of the transponder of FIG. 3, the components shown in FIGS. 3 and 5 are designated by the same references as in these Figures.

It will be noted that, during the transmission phase, switching means 32 connects terminal 32b to terminal 32c, terminals 32a and 32d being free, so that antenna 3 is connected in series to capacitor 8. In other words, capacitor 8 and antenna 3 are connected so as to form a series LC circuit.

Preferably, capacitor 8, switching means 32 and processing means 33 are made in a monolithic manner in a single semi-conductor substrate. By way of alternative embodiment, in addition to these components, antenna 3 may also be made in a monolithic manner.

Figure 6:
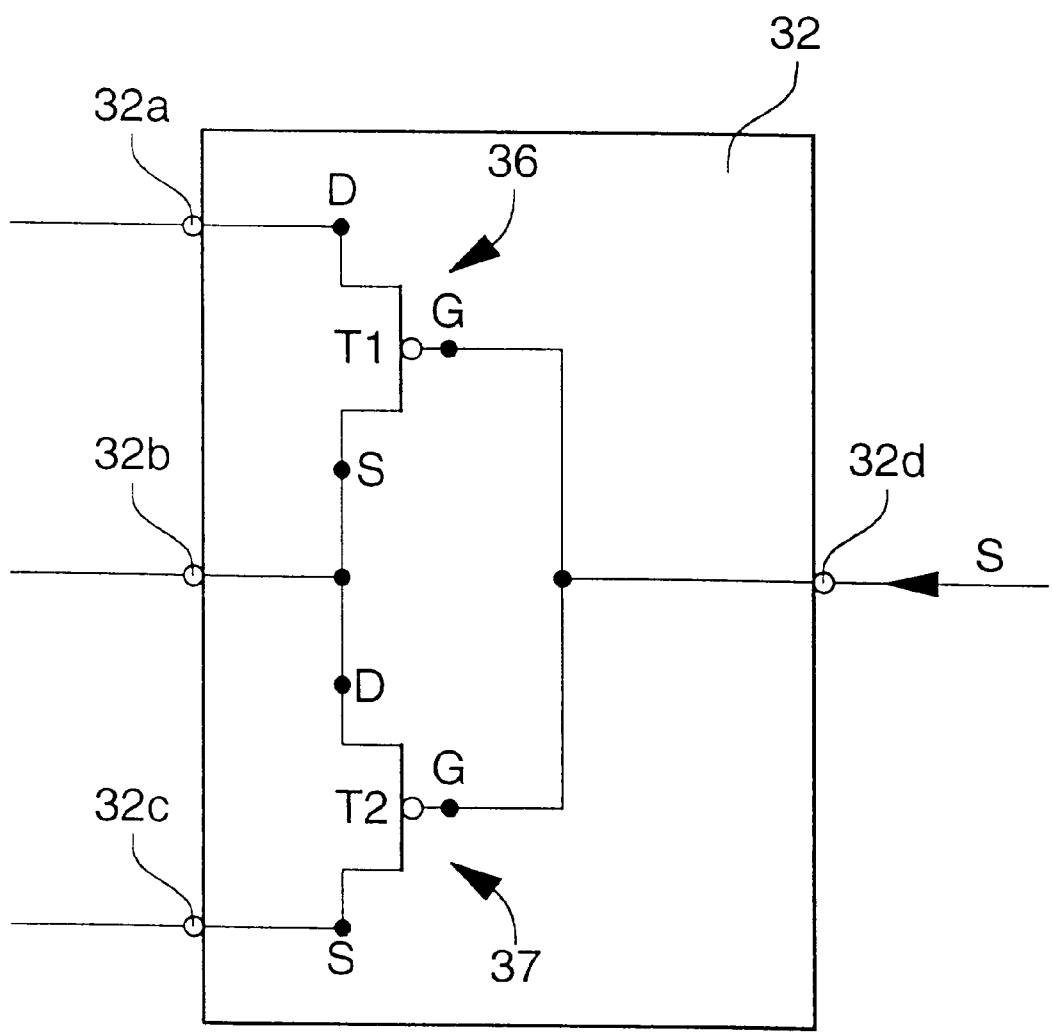
FIG. 6 shows a preferred embodiment of the switching means of the transponder of FIG. 3.

FIG. 6 shows a preferred embodiment of switching means 32 which include two field effect transistors T1 and T2 to form respectively the two switches 36 and 37. Solely by way of illustration, assuming that the substrate is a P type silicon substrate, transistor T1 is a P channel transistor and transistor T2 is an N channel transistor.

Each of transistors T1 and T2 includes a gate terminal, a drain terminal and a source terminal. The drain terminal of transistor T1 is connected to terminal 32a, and its source terminal is connected to terminal 32b. The source terminal of transistor T2 is connected to terminal 32c, and its drain terminal is connected to terminal 32b. The gate terminals of transistors T1 and T2 are connected to terminal 32d so as to be controlled by processing means 33, so that transistor T2 is blocked when transistor T1 is conductive, and conversely, which is achieved by the two configurations of transponder 30 described in relation to FIGS. 4 and 5.

Solely by way of illustration, an operating mode of transponder 30, whose structure is described hereinbefore in relation to FIGS. 3 to 6 will now be described, such mode being during a half duplex communication.

Figure 2:
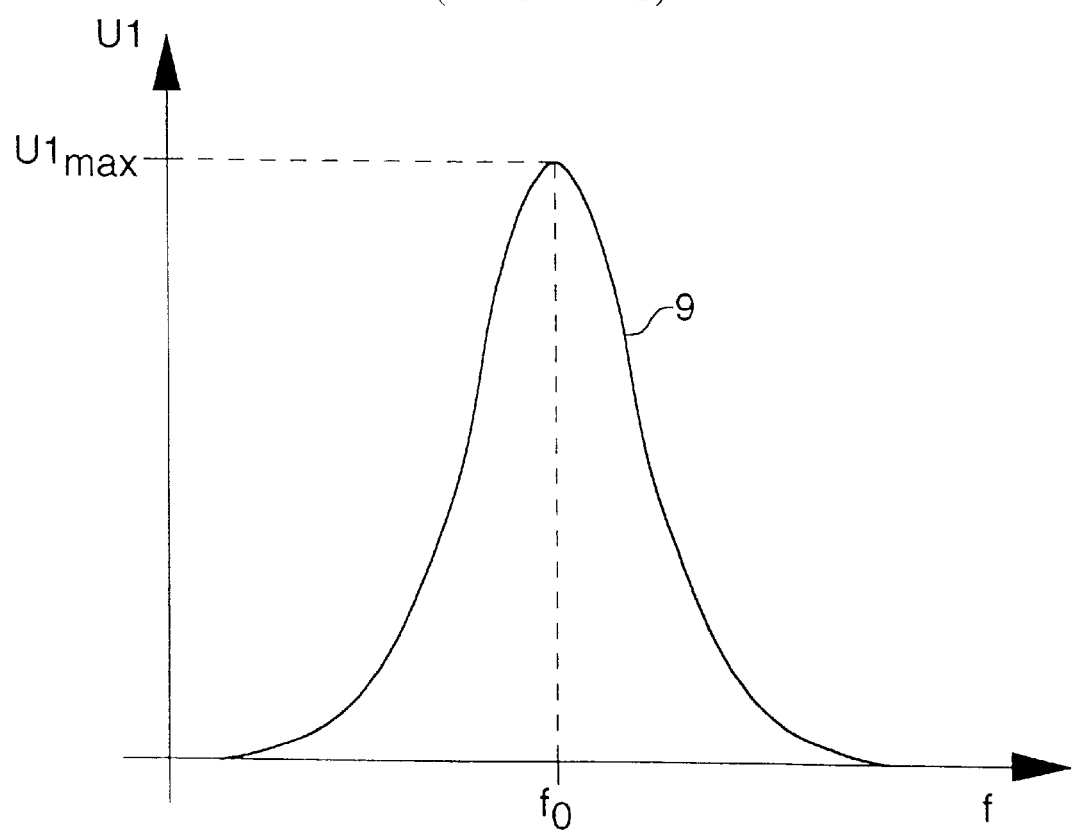
FIG. 2 which has already been cited, shows a wave shape illustrating the relationship between the amplitude and the frequency of a signal present in the transponder of FIG. 1.

During the reception phase, the configuration of transponder 30 is substantially identical to that of the conventional transponder described in relation to FIGS. 1 and 2, as was already mentioned.

Thus, the station transmits a radioelectric signal X1 at frequency fo such as that defined in equation (1). Antenna 3 of transponder 30 converts this signal into voltage U1 whose frequency is equal to frequency fo described hereinbefore. Processing means 33 controls switching means 32 to connect antenna 3 and capacitor 8 to form a parallel LC circuit. The LC circuit then generates a voltage resonance, and the electric power supplied from antenna 3 to processing means 33 is optimum.

Figure 7:
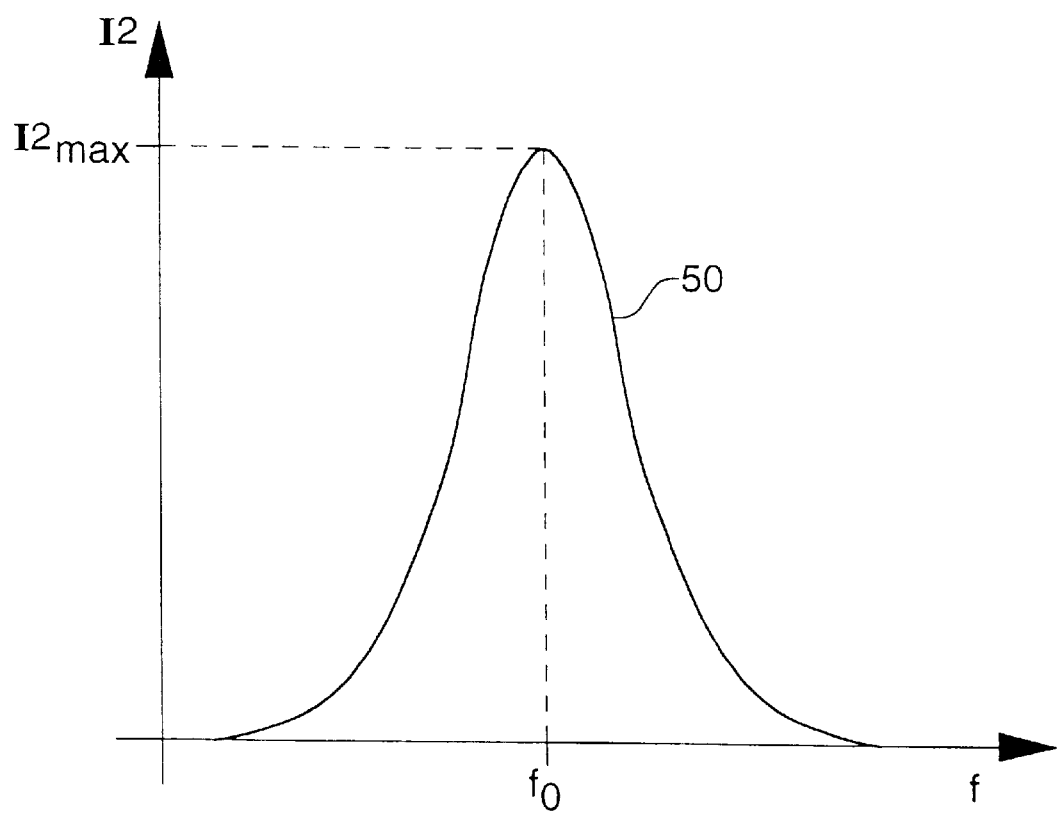
FIG. 7 shows a wave shape illustrating the relationship between the amplitude and the frequency of a signal present in the transponder of FIG. 3, during a transmission phase.

During the transmission phase, since the circuit connected to the terminals of processing means is a series LC circuit, said means supply an electric voltage U2, contrary to the case of the conventional transponder described in relation to FIG. 1, in which processing means 33 supplies an electric current I2. It is clear that current I2 present in transponder 30 during the transmission phase is not limited. Moreover, current I2 is supplied at a frequency which is equal to resonance frequency fo defined hereinbefore. FIG. 7 shows a wave shape 50 illustrating the relationship between the amplitude and the frequency of said current I2 during a transmission phase. Thus, when the frequency f of said current is substantially equal to said resonance frequency fo, the amplitude of current I2 is maximum. It is then said that the series LC circuit is current resonant.

Thus, the transponder according to the present invention is particularly advantageous, since the configurations of this transponder in the reception phase and the transmission phase allow the electric power exchanged between the antenna and the processing means to be optimised.

It goes without saying for those skilled in the art that the detailed description hereinbefore can undergo various modifications without departing from the scope of the present invention.

What is claimed is:

1. A transponder intended to receive data during a first phase or reception phase, and to provide other data during a second phase or transmission phase, said transponder including:

a coil arranged as an antenna so as to be able to receive and transmit radioelectric signals containing said data;

a capacitor connected to said coil, to form a resonant circuit;

processing means arranged to be able to receive, process and supply said data; and supply means connected to said processing means, and arranged to be able to provide an electric supply signal to different components of the transponder, said transponder further including switching means connected to the capacitor and the processing means, and arranged so that, under the control of the processing means, the switching means can connect the processing means in series to the capacitor and the coil which are connected to each other to form during the entire duration of the reception phase, a parallel LC circuit and, during the entire duration of the transmission phase, a series LC circuit.

2. A transponder according to claim 1, wherein the coil, the capacitor, the switching means and the processing means are made in a monolithic manner in a single semi-conductor substrate.

3. A transponder according to claim 2, wherein the antenna is made in a monolithic manner in said substrate.

4. A transponder according to claim 3, wherein the switching means includes:

a first transistor which is a P channel field effect transistor; and a second transistor which is an N channel field effect transistor.

5. A transponder according to claim 2, wherein the switching means include:

a first transistor which is an N channel field effect transistor; and a second transistor which is a P channel field effect transistor.

6. A transponder according to claim 5, wherein the first and second transistors are controlled by the processing means.

\* \* \* \* \*